(12) United States Patent
Suzuki et al.

(10) Patent No.: US 8,935,087 B2
(45) Date of Patent: Jan. 13, 2015

(54) COLLISION DETERMINATION APPARATUS FOR VEHICLE

(75) Inventors: Akira Suzuki, Hekinan (JP); Hiroyuki Takahashi, Nishikamo-gun (JP)

(73) Assignees: Denso Corporation, Kariya (JP); Toyota Jidosha Kabushiki Kaisha, Toyota (JP)

( * ) Notice: Subject to any disclaimer, the term of this patent is extended or adjusted under 35 U.S.C. 154(b) by 670 days.

(21) Appl. No.: 12/456,106

(22) Filed: Jun. 11, 2009

(65) Prior Publication Data

US 2009/0312949 A1 Dec. 17, 2009

(30) Foreign Application Priority Data

Jun. 12, 2008 (JP) .................................. 2008-154079

(51) Int. Cl.
*G05D 1/02* (2006.01)
*G06F 17/10* (2006.01)
*G06G 7/78* (2006.01)
*B60R 21/0136* (2006.01)
*B60R 21/01* (2006.01)

(52) U.S. Cl.
CPC ... *B60R 21/0136* (2013.01); *B60R 2021/01027* (2013.01)
USPC .......................................... 701/301; 701/300

(58) Field of Classification Search
USPC ......................................................... 701/301
See application file for complete search history.

(56) References Cited

U.S. PATENT DOCUMENTS

| 6,561,301 | B1 | 5/2003 | Hayashi et al. | |
|---|---|---|---|---|
| 2004/0002815 | A1* | 1/2004 | Ishizaki et al. | 701/300 |
| 2004/0158376 | A1 | 8/2004 | Knueppel et al. | |
| 2006/0087417 | A1* | 4/2006 | Kiribayashi | 340/435 |
| 2006/0244245 | A1 | 11/2006 | Nonaka et al. | |
| 2007/0106474 | A1* | 5/2007 | Ide | 701/301 |
| 2007/0164574 | A1 | 7/2007 | Tanabe | |
| 2008/0067794 | A1 | 3/2008 | Ide | |
| 2008/0238641 | A1 | 10/2008 | Mader | |
| 2009/0015391 | A1* | 1/2009 | Kiribayashi | 340/436 |

FOREIGN PATENT DOCUMENTS

DE 103 21 209 12/2004
DE 10 2005 036 623 2/2007

(Continued)

OTHER PUBLICATIONS

Office action dated Oct. 12, 2009 in corresponding German Application No. 10 2009 023857.3.

(Continued)

*Primary Examiner* — Ariel Yu
(74) *Attorney, Agent, or Firm* — Harness, Dickey & Pierce, PLC

(57) ABSTRACT

A collision determination apparatus for a vehicle is disclosed. The collision determination apparatus includes: a chamber member that is arranged in a bumper and has therein a chamber space; a main sensor that senses pressure of the chamber space; a safing sensor that senses the pressure of the chamber space independently of the main sensor; and a vehicle speed sensor that senses a speed of the vehicle. The collision determination apparatus detects an occurrence of a collision between an object and a bumper and determines whether the collision necessitates activation of the protection apparatus based on sensing results of the main sensor, the safing sensor and the vehicle speed sensor.

9 Claims, 8 Drawing Sheets

(56) References Cited

FOREIGN PATENT DOCUMENTS

| | | |
|---|---|---|
| JP | 2005-263038 | 9/2005 |
| JP | 2005-329833 | 12/2005 |
| JP | 2006-510549 | 3/2006 |
| JP | 2006-117157 | 5/2006 |
| JP | 2006-515243 | 5/2006 |
| JP | 2007-126014 | 5/2007 |
| JP | 2007-192577 | 8/2007 |
| JP | 2008-008679 | 1/2008 |
| JP | 2008-074127 | 4/2008 |
| WO | WO 2005044646 | 5/2005 |

OTHER PUBLICATIONS

Office action dated Dec. 21, 2010 in corresponding Japanese Application No. 2008-154079.

Notice of Reason for Refusal dated May 6, 2010 in corresponding Japanese application No. 2008-154079 with English translation thereof.

Office action dated Jul. 26, 2011 in corresponding Japanese Application No. 2008-154079.

Office Action dated Nov. 1, 2011 from corresponding Japanese patent application Serial No. 2008-154079 with English translation (5 pages).

* cited by examiner

COLLISION DETERMINATION APPARATUS FOR VEHICLE

CROSS REFERENCE TO RELATED APPLICATION

The present application is based on Japanese Patent Application No. 2008-154079 filed on Jun. 12, 2008, the disclosure of which is incorporated herein by reference.

BACKGROUND OF THE INVENTION

1. Field of the Invention

The present invention relates to a collision determination apparatus for a vehicle, more particularly relates to a vehicle collision determination apparatus that determines an occurrence of a collision based on a pressure change in a bumper of the vehicle.

2. Description of Related Art

Passenger protection systems for a vehicle have been put to practical use. A typical passenger protection system detects a collision between a vehicle and an object, and activates a passenger protection apparatus such as an airbag and the like to protect a passenger of the vehicle. JP-2007-126014A corresponding to US Patent Application Publication No. 2007/0106474 proposes a technique for minimizing malfunction of the passenger protection system in case of a failure of a sensor for vehicle collision detection. According to the technique, the system includes a safing sensor in addition to a main sensor to provide redundancy, and activates the passenger protection apparatus based on a result of a logical product, in other words, AND operation, of a value associated with the output of the main sensor and that of the safing sensor.

Pedestrian protection systems for a vehicle have been proposed. For example, JP-2006-117157A corresponding to US Patent Application Publication No. 2006/0087417 proposes a pedestrian protection system that includes a chamber member and a pressure sensor. The chamber member is arranged in an absorber part in a bumper of the vehicle, and defines therein a chamber space. When a collision between a vehicle and an object deforms the chamber member, the pressure senor senses a pressure change of the chamber space to identify a type of the colliding objects. When the colliding object is identified as a pedestrian, the pedestrian protection system activates a pedestrian protection apparatus such as an active hood system and an airbag on a cowl to protect the pedestrian against the collision. Practical application of this type of pedestrian protection systems is under review.

The inventors consider that, to the pedestrian protection system also, it is necessary to add a safing sensor for redundancy to minimize malfunction of the system in case of sensor malfunction. However, it is found that there exists no effective proposal on it.

SUMMARY OF THE INVENTION

In view of the above and other points, it is an objective of the present invention to provide a collision determination apparatus for a vehicle at a low cost, the collision determination apparatus being capable of ensuring collision detection sensor redundancy or determination circuit redundancy regardless of a location of collision suffering part of a vehicle bumper.

According to an aspect of the present invention, a collision determination apparatus for a vehicle having a bumper is provided. The collision determination apparatus is coupled with a protection apparatus mounted to the vehicle. The collision determination apparatus includes: a chamber member that is arranged in the bumper and has therein a chamber space; a main sensor that senses pressure of the chamber space, thereby providing a first pressure sensing result; a safing sensor that senses the pressure of the chamber space independently of the main sensor, thereby providing a second pressure sensing result; a vehicle speed sensor that senses a speed of the vehicle, thereby providing a speed sensing result; and a collision determination unit that detects an occurrence of a collision between an object and the bumper, and that determines whether or not the collision necessitates activation of the protection apparatus based on the first pressure sensing result, the second pressure sensing result and the speed sensing result.

According to the above collision determination apparatus, since the safing sensor senses the pressure of the chamber space as the main sensor does, it is possible to provide the collision determination apparatus at a low cost, the collision determination apparatus being capable of ensuring collision detection sensor redundancy regardless of a location of collision suffering part of the bumper. Moreover, since the collision determination apparatus includes the vehicle speed sensor, the collision determination apparatus can determine, when the vehicle is making a stop, that the collision does not necessitate activation of the protection apparatus. For example, even when the bumper of the vehicle that is making stop is kicked, the collision determination apparatus does not activate the protection apparatus. Therefore, it is possible to effectively ensure the redundancy. Moreover, if one of the main sensor and the safing sensor has a failure, it is possible to prevent malfunction of the collision determination apparatus when the other of the main sensor and the safing sensor is normal. One main sensor and one safing sensor can be thus minimum components of a collision detecting sensor in the collision determination apparatus. It is therefore possible to provide the collision determination apparatus at a low cost, the collision determination apparatus being capable of ensuring collision detection sensor redundancy.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE EXEMPLARY EMBODIMENTS

Exemplary embodiments are described below with reference to the accompany drawings.

There will be described a passenger protection system 100 and a pedestrian protection system 200 in accordance with comparison examples.

Figure 9:
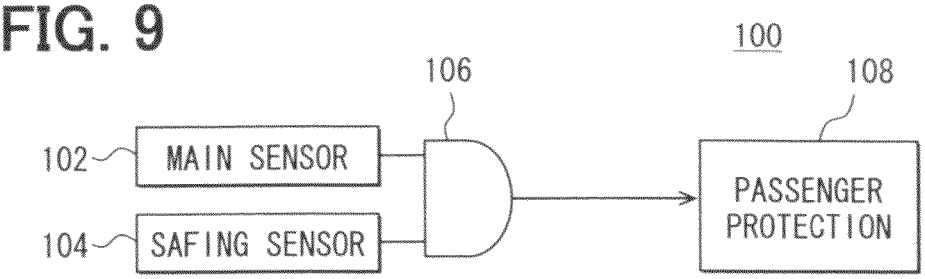
FIG. 9 is a functional block diagram illustrating operation logic of a passenger protection apparatus of a passenger protection system in accordance with a first comparison example.

FIG. 9 is a block diagram illustrating operation logic of a passenger protection system 100 according to one comparison example. As shown in FIG. 9, the passenger protection system 100 includes a main sensor 102, a safing sensor 104, an AND circuit 106 and a passenger protection apparatus 108. The main sensor 102 functions as a collision detection sensor for mainly detecting the occurrence of a collision, and is, for example, an acceleration sensor or a pressure sensor. The safing sensor 104 is used for detecting a collision whose direction is the same as that is to be defected by the main sensor 102, and thereby providing redundancy to the passenger protection system 100. The AND circuit 106 performs a logical AND operation between a value associated with an output of the main sensor 102 and that of the safing sensor 104, and activates the passenger protection apparatus 108 based on a result of the logical AND operation, thereby ensuring collision determination reliability.

Figure 10A:
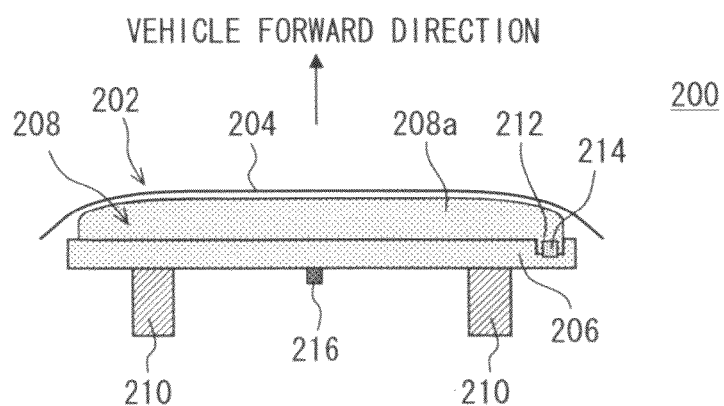
FIG. 10A is a diagram illustrating a pedestrian protection system having an acceleration sensor mounted a chamber member in accordance with a second comparison example.
Figure 10B:
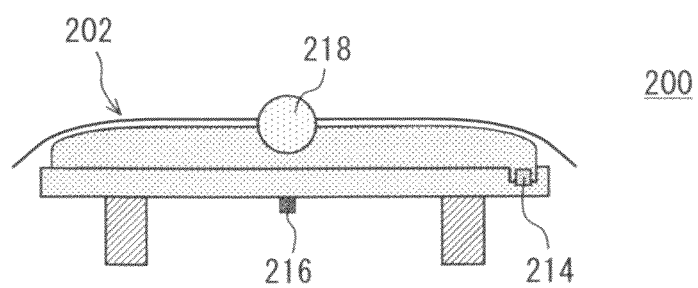
FIG. 10B is a diagram illustrating the pedestrian protection system in accordance with the second comparison example, the system suffering a collision taking place at a vehicle width direction center part of a bumper.
Figure 10C:
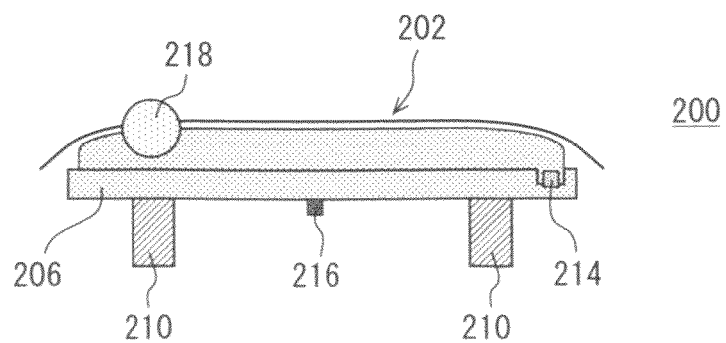
FIG. 10C is a diagram illustrating a pedestrian protection system in accordance with the second comparison example, the system suffering a collision taking place at a vehicle width direction end part of the bumper.

As shown in FIGS. 10A, 10B and 10C, a pedestrian protection system 200 according to one comparison example includes a chamber member and a pressure sensor. The chamber member is arranged in an absorber part in a bumper of the vehicle, and defines therein a chamber space. When a collision between a vehicle and an object deforms the chamber member, the pressure senor senses a pressure change of the chamber space to identify a type of the colliding objects. When the colliding object is identified as a pedestrian, the pedestrian protection system activates a pedestrian protection apparatus such as an active hood system and an airbag on a cowl.

It may be necessary to add a safing sensor for redundancy to the pedestrian protection system to minimize malfunction of the pedestrian protection system in case of sensor malfunction. Regarding the safing sensor to be added to the pedestrian protection system, it may be preferable from cost viewpoint to employ an acceleration sensor that is generally the same as that used in the above passenger protection system.

FIGS. 10A, 10B and 10C illustrate a pedestrian protection system that detects a pressure change resulting from the collision-caused deformation of the chamber member arranged in the bumper of the vehicle, the diagrams being viewed from an upper side of the bumper. As shown in FIGS. 10A to 10C, the pedestrian protection system has an acceleration sensor functioning as the safing sensor. A vehicle bumper 202 of the pedestrian protection system 200 illustrated in FIGS. 10A to 10C includes a bumper reinforcement 206, a chamber member 208, and a side member 210. The chamber member 208 may be integrated with an absorber. The chamber member 208 is arranged in a space defined by the bumper cover 204 and is mounted on a vehicle forward side of the bumper reinforcement 206 so as to extends in a width direction of the vehicle. The chamber member 208 defines therein a chamber space 208a in which air is enclosed.

A pressure sensor 214 is installed, for example, in the chamber space 208a via an attachment hole 212 formed on a vehicle width direction end part of the chamber member 208. One acceleration sensor 216 functioning as the safing sensor 216 is attached on a vehicle rear side of the bumper reinforcement 206 so as to be located at, for example, a vehicle width direction center part of the bumper reinforcement 206. It should be noted that, for simplicity, a pedestrian protection apparatus is not shown in FIGS. 10A, 10B and 10C.

In the pedestrian protection system 200, as shown in FIG. 10B, when an object 218 such as a pedestrian collides with a vehicle bumper 202, the chamber member 208 is deformed and a volume thereof is changed, and accordingly, the air pressure of the chamber space 208a increases. In such a case, the pressure sensor 214 detects the pressure change, while the acceleration sensor 216 detects acceleration resulting from the collision. Then, by using the same protection logic as that used in the passenger protection system illustrated in the FIG. 9, the pedestrian protection system 200 performs an logical AND operation between a value associated with an output of the pressure sensor 214 and that of the acceleration sensor 216 to determine whether the pedestrian protection apparatus should be activated, thereby ensuring redundancy. In the above, the pressure sensor 214 acts as the main sensor and the acceleration sensor 216 acts as the safing sensor.

According to the pedestrian protection system 200, when the object 218 collides with a forward part of the side member 210 as illustrated in FIG. 10C, the resultant acceleration is difficult to conduct to the bumper reinforcement 206, and thus, the output of the acceleration sensor may become small. If multiple acceleration sensors acting as safing sensors are arranged, one or some of the multiple acceleration sensors may provide reliable detection. However, the use of multiple acceleration sensors may lead to a remarkable increase in cost.

It may be preferable from a cost viewpoint that one acceleration sensor be arranged in the pedestrian protection system 200. However, in a case of employing the one acceleration sensor, when a collision suffering part is distant from the acceleration sensor and when the colliding object 218 is light in weight such as a pedestrian, the acceleration resulting from the collision becomes small at the acceleration sensor.

An unacceptable situation in view of the redundancy is such that the safing sensor is switched on in response to acceleration caused by the normal traveling of a vehicle. In some cases, there is no significant difference between an acceleration caused by a pedestrian collision and that caused by the normal traveling of a vehicle, and the acceleration sensor cannot distinguish the difference.

In view of the above and other points, a collision determination apparatus for a vehicle is presented below in accordance with one embodiment, the collision determination apparatus being capable of ensuring collision detection sensor redundancy or determination circuit redundancy regardless of a location of collision suffering part of a vehicle bumper.

Figure 1A:
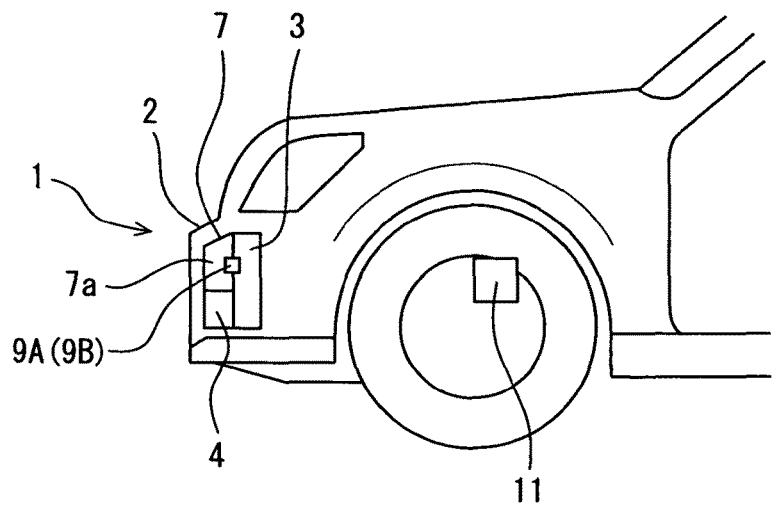
FIG. 1A is a diagram illustrating a collision determination apparatus for a vehicle in accordance with one embodiment.
Figure 1B:
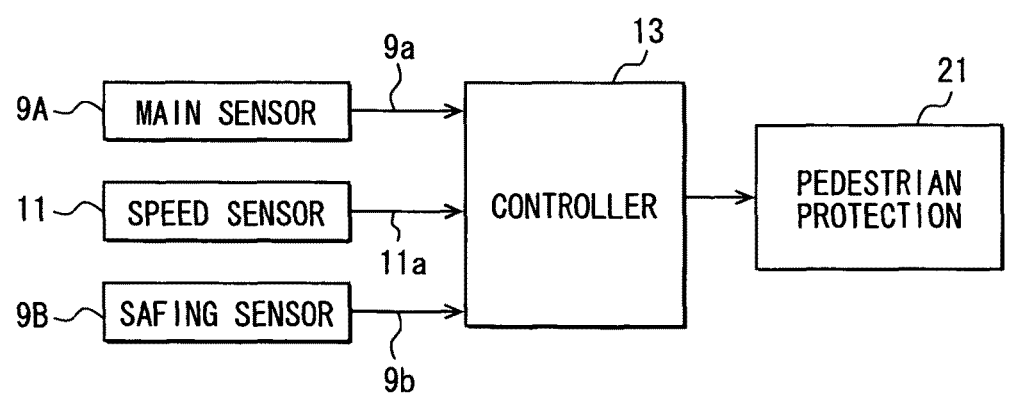
FIG. 1B is a functional block diagram of the collision determination apparatus in accordance with one embodiment.

A collision determination apparatus for a vehicle according to one embodiment detects an occurrence of a collision between a vehicle bumper 1 and an object, and determine whether the collision necessitates activation of a pedestrian protection apparatus 21 mounted to the vehicle. As shown in FIGS. 1A and 1B, the collision determination apparatus includes a chamber member 7, a main sensor 9A, a safing sensor 9B, a vehicle speed sensor 11 and a controller 13. The chamber member 7 is arranged in a vehicle bumper 1 and defines therein a chamber space 7a. The main sensor 9A senses pressure of the chamber space 7a. The safing sensor 9B senses the pressure of the chamber space 7a independently of the main sensor 9A. The vehicle speed sensor 11 senses speed of the vehicle.

The main sensor 9A can function as a collision detection sensor by detecting a pressure change of the chamber space 7a. The safing sensor 9B can also function as a collision detection sensor by detecting the pressure change of the chamber space 7a independently of the main sensors 9A, thereby providing redundancy.

The controller 13 acts as collision determination means or unit, which determines whether a collision necessitates activation of the pedestrian protection apparatus 21 based on a pressure sensing result given by the main sensor 9A, another pressure sensing result given by the safing sensor 9B and a vehicle speed sensing result given by the vehicle speed sensor 11. As shown in FIG. 1B, the-controller 13 is coupled with the pedestrian protection apparatus 21 and controls the pedestrian protection apparatus 21. Thus, the controller 13 can also function as control means or unit for controlling the pedestrian protection apparatus 21.

The pedestrian protection apparatus 21 is used for protecting a person, such as a pedestrian, against his or her collision with the vehicle. The pedestrian protection apparatus 21 includes an apparatus such as an active food apparatus, an airbag on a cowl and the like. The pedestrian protection apparatus 21 performs a pedestrian protection operation in accordance with a control signal outputted from the controller 13.

Figure 2A:
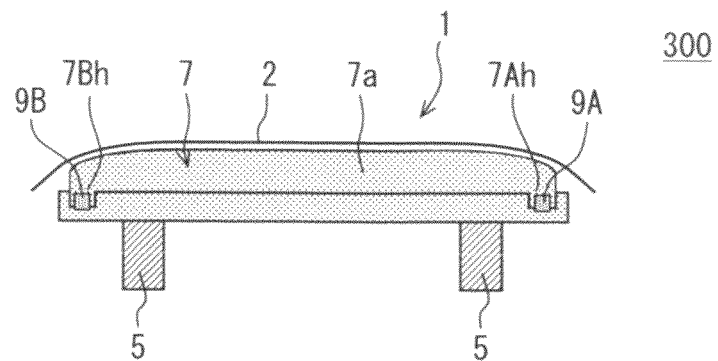
FIG. 2A is a diagram illustrating a main sensor and a safing sensor mounted to a chamber member in accordance with one embodiment.
Figure 2B:
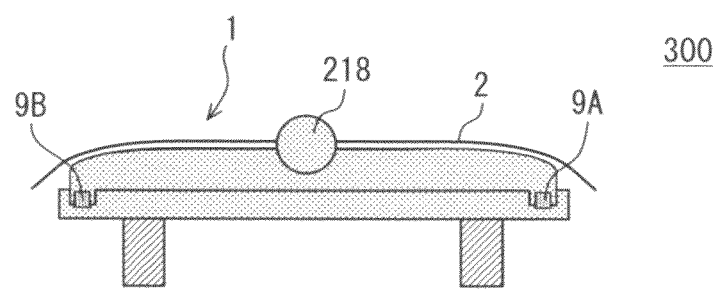
FIG. 2B is a diagram illustrating a main sensor and a safing sensor mounted to a bumper that suffers a collision at a vehicle width direction center part of the bumper in accordance with one embodiment.
Figure 2C:
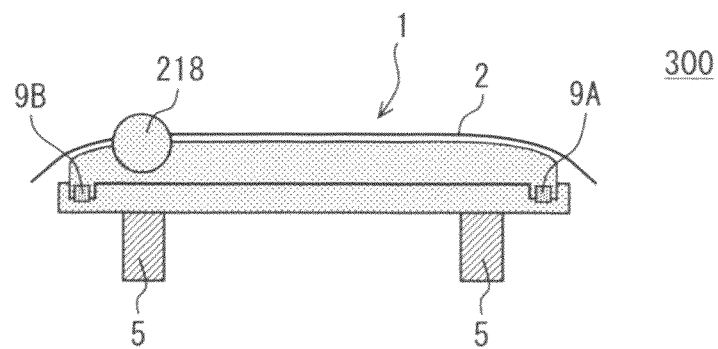
FIG. 2C is a diagram illustrating a main sensor and a safing sensor mounted to a bumper that suffer a collision at a vehicle width direction end part of the bumper in accordance with one embodiment.

The vehicle bumper 1 receives therein a bumper reinforcement 3, the chamber member 7 and an absorber 4, which are arranged on a vehicle rear side of a bumper cover 2. The chamber member 7 and the absorber 4 are arranged on a vehicle front side of the bumper reinforcement 3, so that the absorber 4 is located below and adjacent to the chamber member 7. As shown in FIGS. 2A to 2C, a front side member 5 is located on and adjacent to a vehicle rear side of the bumper reinforcement 3.

The chamber member 7 is arranged in the vehicle bumper 1 and located on a vehicle front side of the bumper reinforcement 3. The chamber member 7 has a shape extending generally along the bumper reinforcement 3, and defines therein the chamber space 7a. As a whole, the chamber member 7 is integrally formed by blow molding using a soft resin material such as a low-density polyethylene and the like. The chamber member 7 forms therein the chamber space 7a, and an air is enclosed in the chamber space 7a. Pressure of the air in the chamber space 7a is normally maintained at atmospheric pressure in order to suppress deformation of the chamber member 7 due to an atmospheric pressure variation resulting from, for example, a change in altitude of the vehicle. To maintain the pressure, the chamber member 7 may be configured such that the chamber space 7a communicates with an outside via a clearances defined between a pressure receive portion of the main sensor 9A and an attachment hole, and via a clearance defined between a pressure receive portion of the safing sensor 9B and an attachment hole.

The bumper reinforcement 3 has a metal frame with a generally belt shape extending in a longitudinal direction thereof. As shown in FIGS. 2A to 2c, the bumper reinforcement 3 is fixed to the front side member 5 so that the longitudinal direction of the bumper reinforcement 3 is generally parallel to the width direction of the vehicle and a surface of the bumper reinforcement 3 faces a surface of the bumper cover 2.

The absorber 4 is fixed to a lower part of the bumper reinforcement 3. The absorber has a curved surface which faces and extends along an inner wall of the bumper cover 2. The absorber 4 is typically made from a foamed resin and can absorb a collisional impact by deforming.

As shown in FIGS. 1A, 1B and 2A to 2C, known pressure sensors capable of detecting a gas pressure change are used as the main sensor 9A and the safing sensor 9B. Each of the main sensor 9A and the safing sensor 9B includes a housing, a sensing element received in the housing, and a pressure introduction pipe (not shown) that functions as a pressure receive portion for introducing pressure to the sensing element. The housing of each of the main sensor 9A and the safing sensor 9B is fixed in the bumper reinforcement 3, and a tip part of the pressure introduction pipe is inserted in the chamber space 7a of the chamber member 7 through an attachment hole formed on the chamber member 7. In one embodiment, as shown in FIGS. 2A to 2C, the chamber member 7 has thereon multiple attachment holes 7Ah, 7Bh, which are formed as openings through which the main sensor 9A and the safing sensor 9B are inserted in the chamber space 7a. The main sensor 9A and the safing sensor 9B are provided separately from each other and individually inserted in the chamber space 7a through the multiple attachment hole, e.g., two attachment hole 7Ah and 7Bh. Accordingly, it is possible to ensure collision detection sensor redundancy.

The chamber member 7 is arranged in the vehicle bumper 1 so as to extend in the width direction of the vehicle, and the chamber member 7 has the attachment holes 7Ah and 7Bh at vehicle width direction end parts thereof, as shown in FIGS. 2A to 2C. According to the above structure, it is possible to reliably detect an occurrence of a collision at any places of the vehicle bumper 1 in the vehicle width direction by using the redundancy-ensured collision detection sensor provided by the main sensor 9A and the safing sensor 9B.

The chamber member 7 is arranged on a vehicle front side of the bumper reinforcement 3. When a collisional impact crushes the chamber member 7 and causes the pressure change, the pressure change is transmitted to the main sensor 9A and the safing sensor 9B via the pressure receive portion inserted in the chamber space 7a. The main sensor 9A and the safing sensor 9B individually sense the pressure change of the air introduced from the chamber space 7a, and output sensing signals to the controller 13. More specifically, the main sensor 9A and the safing sensor 9B are respectively and electrically connected with the controller 13 via lines 9a, 9b, and output the sensing signal to the controller 13. A level of the sensing signal may be proportional to the sensed pressure.

The vehicle speed sensor 11 is electrically connected with the controller 13 via a line 11a and may be a known vehicle speed sensor capable of detecting a traveling speed of a vehicle. In one embodiment, a wheel speed sensor is employed as the vehicle speed sensor 11.

The controller 13 includes an electronic control unit and controls inflation of an airbag on a cowl and the like when a colliding object is determined to be a pedestrian. The controller 13 receives signals from the main sensor 9A, the safing sensor 9B and the vehicle speed sensor 11 via the lines 9a, 9b and 11a, respectively. The controller 13 determines weather the collision necessitates activation of the pedestrian protection apparatus 21 based on the pressure value given from the main sensor 9A, and the pressure value given from the safing sensor 9B and the vehicle speed value given from the vehicle speed sensor 11. More specifically, when the controller 13 determines that the colliding object is a pedestrian, the controller 13 outputs a control signal for activating the pedestrian protection apparatus 21. The pedestrian protection apparatus 21 performs a pedestrian protection operation in accordance with the control signal from the controller 13. For example, the pedestrian protection apparatus 21 activates an active food device, or causes the airbag to inflate over a windshield of the vehicle or the like.

According to the collision determination apparatus for a vehicle of one embodiment, when an object collides with the vehicle bumper 1, a collision suffering part of the chamber member 7 is crushed and air pressure in the chamber space 7a increases and changes. The air pressure change in the chamber space 7a is individually detected by the main sensor 9A and the safing sensor 9B. The controller 13 reads the sensing signals from the main sensor 9A and the safing sensor 9B via through the lines 9a, 9b, and reads the vehicle speed signal from the vehicle speed sensor 11 via the line 11a. The controller 13 determines whether or not the colliding object is a pedestrian based on a maximum value, i.e., a peak value, of the pressure value given by the main sensor 9A during the pressure change and a maximum value, i.e., a peak value, of the pressure value given by safing sensor 9B. It should be noted that a mass acting on the vehicle bumper 1 is typically different between a collision involved in a pedestrian and that involved in other objects. Thus, it is possible to identify a type of the colliding object by setting a threshold between maximum values supposed to be detected in pedestrian collisions and those in another type of collisions, regarding the maximum value of the pressure value given by each of the main sensor 9A and the safing sensor 9B. In one embodiment, the controller 13 identifies a type of the colliding object further based on a vehicle speed at the collision sensed by the vehicle speed sensor 11, because the deformation of the chamber member 7 and the outputs from the main sensor 9A and the safing sensor 9B are changeable according to a collision impact energy, which depends on mass and velocity involved in the collision.

The collision determination apparatus can utilizes various determination manners to determine whether or not the colliding object is a pedestrian based on the collision-causing change of the pressure sensed by the main and safing sensors 9A, 9B and the vehicle speed at the collision sensed by the vehicle speed sensor 11. For example, the above description gives a first determination manner as one exemplary determination manner, the first determination manner being such that the controller 13 determines whether a colliding object is pedestrian or not by comparing the peak values of the pressure values given by the main sensor 9A and the safing sensor 9B to a threshold. Other exemplary determination manners are described below.

There will be described a second determination manner. In the second determination manner, an effective mass of a colliding object is determined, and then the effective mass is compared to a threshold to determine whether the colliding object is a pedestrian. In a typical collision between the vehicle bumper 1 and an object, the vehicle bumper 1 absorbs kinetic energy of the colliding object because of an intrinsic function of the vehicle bumper 1. Once an energy absorbed by the vehicle bumper 1 (referred to also bumper absorption energy) is determined, the kinetic energy of the colliding object can be determined based on the equation of motion, and thus, a mass of the colliding object can be precisely determined. The mass of the colliding object referred herein is an effective mass of the colliding object. The effective mass is a part of the total mass of the colliding object and corresponds to a part of the colliding object that provides the energy relevant to the collision at the vehicle bumper 1.

The kinetic energy E of a colliding object with mass M is expressed as $$E = \frac{MV^2}{2} \quad \text{Eq. (1)}$$

where V is collision velocity.

When the colliding object with mass M collides with the vehicle bumper 1 at the collision velocity V (which corresponds to a vehicle speed sensed by the vehicle speed sensor), the vehicle bumper 1 is deformed by $\Delta S$ due to a collisional force F, and the chamber member 7 is crushed and a volume of the chamber space 7a is changed by $\Delta V$. Then, each of the main sensor 9A and the safing sensor 9B senses the pressure change $\Delta P$.

The bumper absorption energy $E_1$ can be obtained by integrating the collision force F over the deformation $\Delta S$, given by $$E_1 = \int F ds. \quad \text{Eq. (2)}$$

Since the effective mass of the colliding object is defined in the above-described way, all of the above-described kinetic energy E of the colliding object is absorbed by the bumper. Thus, the kinetic energy E is equal to the bumper absorption energy E1.

$$E_1 = E = \frac{MV^2}{2} \quad \text{Eq. (3)}$$

From the Eq. (3), the effective mass M is calculated as:

$$M = \frac{2E_1}{V^2}. \quad \text{Eq. (4)}$$

As seen above, the bumper absorption energy E1 can be obtained based on the peak value of the changing pressure in the chamber space 7a detected by each of the main sensor 9A and the safing sensor 9B, and the effective mass M can be derived from $M=2E_1/V^2$ where V is the detected vehicle speed at the collision. It is thereby possible to obtain the effective mass M of the colliding object in a theoretically precise manner based on the equation of motion, and thereby to precisely identify a type of the colliding object.

There will be described a third determination manner. In the third determination manner, each of the pressure values sensed by the main sensor 9A and the safing sensor 9B is integrated over time, and a determination value is calculated by dividing the integration value by the vehicle speed at the collision. Then, the collision determination apparatus determines whether the calculated determination value is within a predetermined threshold range, thereby determining whether the colliding object is a pedestrian.

Figure 3:
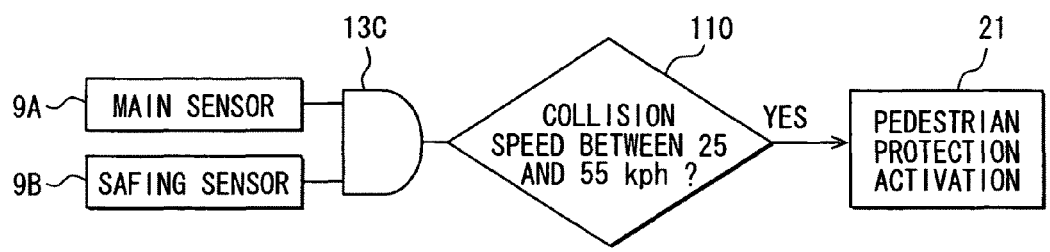
FIG. 3 is a block diagram illustrating a schematic logic for a collision determination apparatus to activate a pedestrian protection apparatus in accordance with one embodiment.

There will be described redundancy of sensors and the like in the collision determination apparatus for a vehicle. FIG. 3 is a block diagram illustrating an exemplary logic for the collision determination apparatus to activate the pedestrian protection apparatus. FIG. 9 illustrates an exemplary logic of activation of a passenger protection apparatus in accordance with a comparison example. As shown in FIG. 3, a pedestrian protection system 300 includes the main sensor 9A, the safing sensor 9B, an AND circuit 13C, and a vehicle speed detection part 110, a pedestrian protection apparatus 21. As described above, the main sensor 9A functions as a collision detection sensor for mainly detecting a collision by sensing a pressure change in the chamber space 7a formed in the chamber member 7, which is arranged in the vehicle bumper 1. The safing sensor 9B is provided to ensure redundancy and senses the pressure change in the chamber space 7a independently of the main sensor 9A. The AND circuit 13C performs an logical AND operation between a value associated with a sensing result of the main sensor 9A and that of the safing sensor 9B. The vehicle speed detection part 110 determines whether the vehicle speed at the collision is in a predetermined threshold range between a predetermined minimum value and a predetermined maximum value, for example, between 25 km/h and 55 km/h. When "true" is indicated by the logical AND operation and when the vehicle is determined to be within the predetermined threshold range, the pedestrian protection apparatus 21 is activated. Through the above manners, collision determination reliability is ensured. A reason why the pedestrian protection apparatus 21 is activated in the case of the vehicle speed within the predetermined threshold range is that a protection function of the pedestrian protection apparatus 21 typically operates in an effective way in a certain vehicle speed range determined by, for example, a vehicle shape or the like.

Referring to FIGS. 2A, 2B and 2C, there will be described an operation and an advantage of the collision determination apparatus. FIGS. 2A, 2B and 2C are diagrams illustrating the main sensor 9A and the safing sensor 9B attached to the chamber member 7, each diagram being viewed from an upper side of the vehicle bumper. In FIG. 2A, the vehicle bumper 1 is free from a collision. In FIG. 2B, a collision between an object 218 and the vehicle bumper 1 is taking place around a vehicle width direction center part of the vehicle bumper. In FIG. 2C, the collision is taking place around a vehicle width direction end part of the vehicle bumper.

According to the pedestrian protection system 300 of one embodiment, when an object 218 such as a pedestrian or the like collides with the vehicle bumper 1 as shown in FIG. 2B, the deformation of the chamber member 7 leads to a volume change of the chamber space 7a and a pressure increase of the chamber space 7a. The main sensor 9A and the safing sensor 9B detect the pressure change in the same chamber space 7a of the chamber member 7. Then, in line with the logic for activation of the pedestrian protection apparatus (see FIG. 3), the AND circuit 13C performs a logical AND operation between a value associated with an output of the main sensor 9A and that of the safing sensor 9B. The pedestrian protection apparatus 21 is activated when "true" is indicated by the logical AND operation and when the vehicle speed detected by the vehicle speed detection part 110 is in a range, for example, between 25 km/h and 55 km/h. In accordance with the above-described operation, redundancy is ensured.

Because of the above operational way, even when an object 218 such as a pedestrian or the like collides with a vehicle bumper 1 at a part located forward of the front side member 5 as shown in FIG. 2C, the main sensor 9A and the safing sensor 9B can individually detect the pressure change of the same chamber space 7a. Thus, unlike a case of using the acceleration sensor as shown in FIGS. 10A, 10B, 10C, the output of the safing sensors does not become small. Therefore, a single chamber-type pressure sensor having the similar configuration of the main sensor 9A can suffice as the safing sensor 9B, and thus, it is possible to suppress an increase in cost of the safing sensor 9B.

As seen above, a single chamber-type pressure sensor having the similar configuration of the main sensor 9A can suffice as the safing sensor 9B, and may be preferable in terms of cost reduction. It should be noted that, according to embodiments, the pressure change to be detected by a sensing part does not become small even when a light-weight object such as a pedestrian and the like collides with the vehicle bumper 1 at a part distant from the safing sensor 9B.

Since the main sensor 9A and the safing sensor 9B individually sense the pressure change of the same chamber space 7a, one may suppose that there arises such a difficulty that the redundancy can not work if the kicking of the bumper cover 2 or the like turns on both of the main sensor 9A and the safing sensor 9B.

The pedestrian protection system 300 of the present embodiment can eliminate the above-described difficulty because the pedestrian protection system 300 activates the pedestrian protection apparatus 21 only when the vehicle speed detection part 110 determines that the vehicle speed at the collision is in a range, for example, between 25 km/h and 55 km/h. For example, as described in detail later, the pedestrian protection system 300 unitizes a vehicle speed signal from the vehicle speed sensor in addition to pressure sensing signals,from the pressure sensors in order to precisely determine whether a colliding object is a pedestrian or not. Thus, the pedestrian protection apparatus cannot be activated when the vehicle is making a stop. Therefore, the detecting of the pressure change of the same chamber space 7a by the main sensor 9A and the safing sensor 9B does not bring in problem.

According to the above configuration, even if one of the main sensor 9A and the safing sensor 9B has a failure at a speed within an operating range of the pedestrian protection system 300, the pedestrian protection system 300 can properly operate without errors when the other of the main sensor 9A and the safing sensor 9B is normal. Therefore, one main sensor 9A and one safing sensor 9B can be minimum components of a collision detecting sensor in the system.

As seen above, the present embodiment provides the collision determination apparatus for a vehicle at a low cost, the collision determination apparatus being capable of ensuring collision detection sensor redundancy regardless of a location of collision-suffering part of the vehicle bumper 1.

Figure 4:
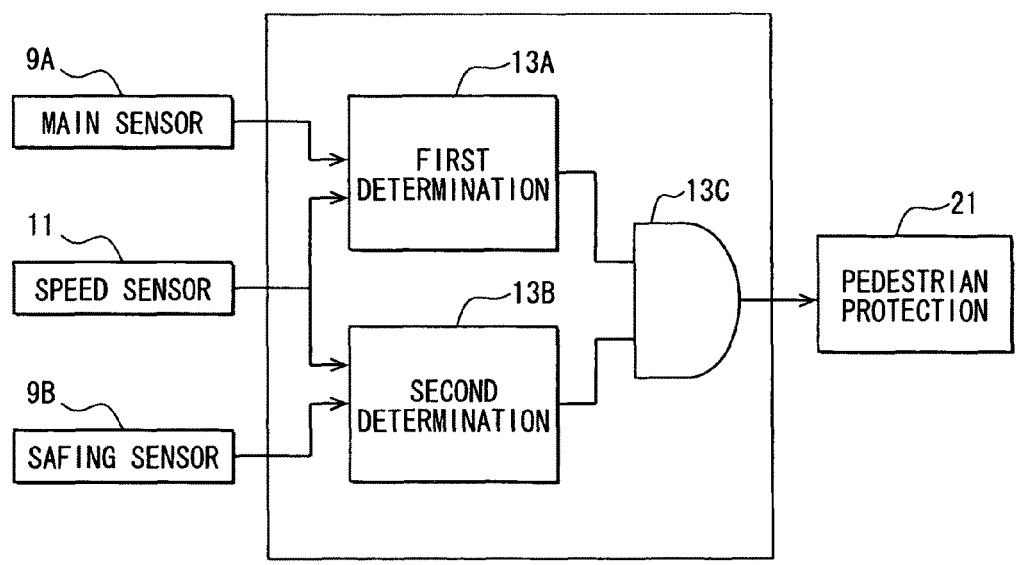
FIG. 4 is a functional block diagram of a controller of a collision determination apparatus in accordance with one embodiment.

FIG. 4 is a functional block diagram illustrating a controller 13, which can function as collision determination means or unit.

As shown in FIG. 4, the controller 13 functioning as the collision determination means or unit includes a first determination part 13A (also referred to as a main determination part), a second determination part 13B (also referred to as a safing determination part) and an AND circuit 13C. The first determination part 13A determines whether or not a collision necessitates activation of the pedestrian protection apparatus 21 based on the pressure sensing result provided by the main sensor 9A and the vehicle speed sensing result provided by the vehicle speed sensor 11. The second determination part 13B determines whether or not the collision necessitates activation of the pedestrian protection apparatus 21 by comparing the predetermined threshold to the pressure sensing result provided by the safing sensor 9B. The AND circuit 13C performs a logical AND operation between a determination result made by the first determination part 13A and that made by the second determination part 13B, and outputs a logical product (AND result). The first and second determination parts 13A and 13B respectively includes determination circuits, which are provided separately from each other.

The first determination part 13A identifies a type of the colliding object by, for example, using the above-described second determination manner, in which the pressure value sensed by the main sensor 9A and the vehicle speed at the collision sensed by the vehicle speed sensor 11 are substituted into a predetermined equation to obtain an effective mass of the colliding object and the effect mass is compared to a predetermined threshold. The second determination part 13B identifies a type of the colliding object by, for example, using the above-described first determination manner, in which the peak value (maximum value) of the changing pressure sensed by the safing sensor 9B is computed and the peak value is compared to a predetermined threshold. According to the above determination manners, each of the first determination part 13A and the second determination part 13B needs to have high computing performance, and thus, it may be preferable that each of the first determination part 13A and the second determination part 13B include a CPU.

As seen above, the controller 13 functioning as the collision determination means or unit performs two collision determinations by using two determination logics. One is a collision determination (also referred to as a main determination) that is made by the first determination part 13A based on the pressure sensing result given by the main sensor 9A and the vehicle speed sensing result given by the vehicle speed sensor 11. The other is a collision determination (also referred to as a safing determination) that is made by the second determination part 13B based on the pressure sensing result given by the safing sensor 9B. The controller 13 performs the logical AND operation between results of the two determination logics. Therefore, the present embodiment can further ensure determination circuit redundancy.

Alternatively, the controller 13 may have such a configuration that the first determination part 13A is mainly provided by a CPU, and the second determination part 13B is mainly provided by a relatively simple IC with a comparator. For example, the main sensor 9A may be connected with the CPU serving as a control circuit for performing the main determination, and the safing sensor 9B may be connected with the relatively simple IC with a comparator serving as a control circuit for performing the safing determination. In such a configuration, the second determination part (safing determination part) 13B is configured not to obtain the peak value of the changing pressure by computing, but simply compares the pressure value from the safing sensor 9B to a collision detection threshold and outputs a control signal when the pressure value reaches the threshold. Accordingly, it is possible to provide the second determination part 13B by using the relatively simple IC with a comparator, and it is possible to provide the collision determination apparatus at low cost as a whole. In such a case, an output signal from the safing sensor 9B is inputted to a non-inversion input terminal of the comparator and a voltage acting as the collision detection threshold is inputted to an inversion input terminal. When the output signal from the safing sensor 9B reaches the collision detection threshold, in other words, when the output signal from the safing sensor 9B and the collision detection threshold has the same voltage level, the comparator outputs an ON signal.

Figure 5:
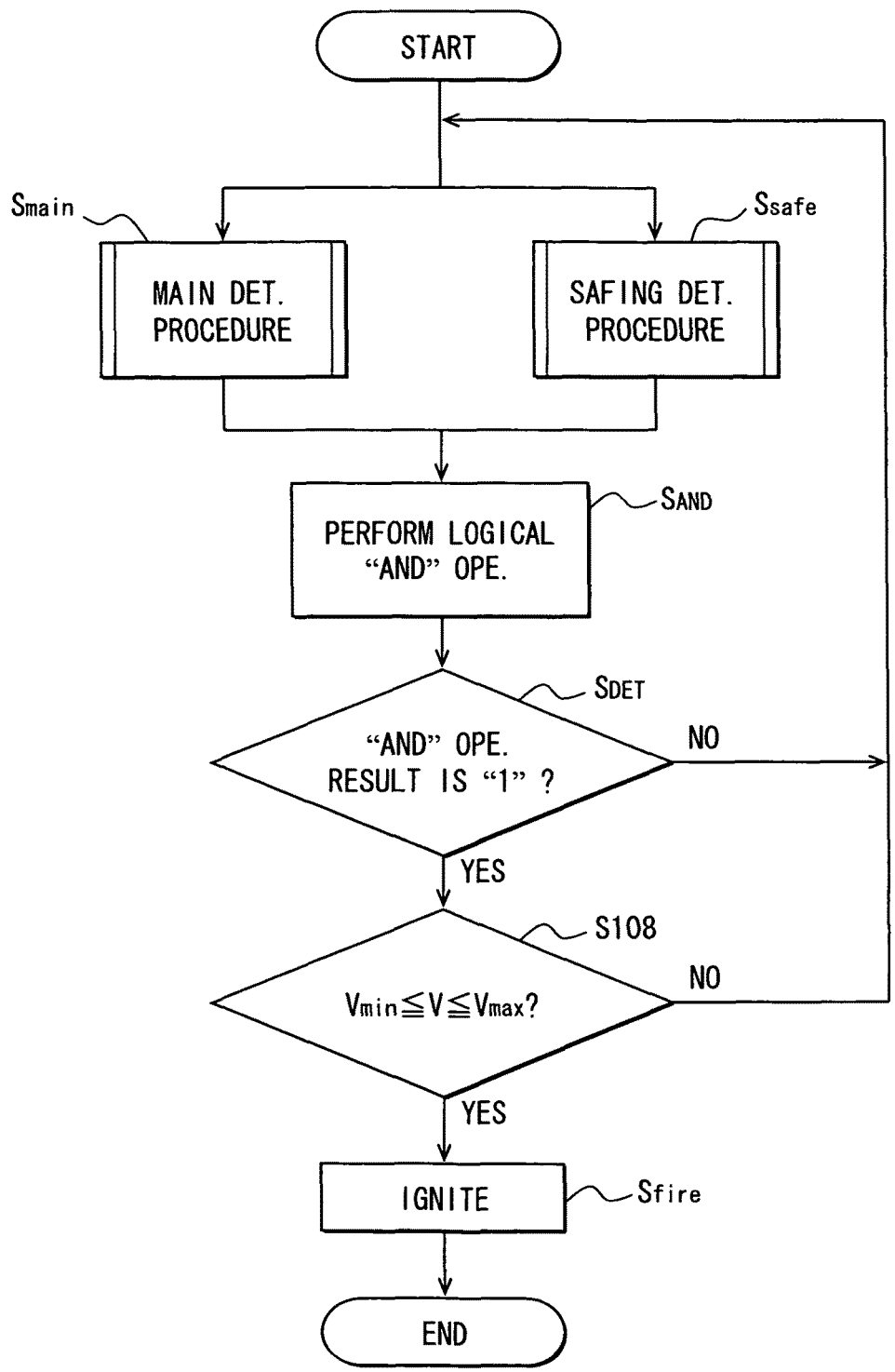
FIG. 5 is a flow chart illustrating a first exemplary processing to be performed by a controller of a collision determination apparatus in accordance with one embodiment.

There will be described a processing flow for the controller 13 of the collision determination apparatus. FIG. 5 is a flow chart illustrating one exemplary processing flow for the controller 13. The controller 13 has a CPU and a storage medium (not shown) such as memory and the like. The storage medium stores therein a program for collision determination. The CPU performs the below described processing in accordance with the program.

As shown in FIG. 5, the processing of the controller 13 performs a main determination procedure $S_{main}$ by using the first determination part 13A and a safing determination procedure $S_{safe}$ by using the second determination part 13B, so that the main and safing determination procedures are performed independently of each other. The main determination procedure $S_{main}$ utilizes the above-described second determination manner to identify a colliding object type, such that: the effective mass of the colliding object is determined such that the pressure value detected by the main sensor 9A and the vehicle speed at the collision detected by the vehicle speed sensor 11 are substituted into a predetermined equation; and the effective mass is compared to a predetermined threshold. The safing determination procedure $S_{safe}$ utilizes the above-described first determination manner to identify a type of the colliding object type, such that: the peak value of the changing pressure detected by the safing sensor 9B is computed; and the maximum value is compared to a predetermined threshold.

At both of $S_{main}$ and $S_{safe}$, the controller 13 determines weather or not the colliding object is a pedestrian. At $S_{AND}$, the controller 13 performs a logical AND operation between a determination result of the main determination procedure $S_{main}$ and that of the safing determination procedure $S_{safe}$. At $S_{DET}$, the controller 13 determines whether or not a result of the logical AND operation is "1", in other words, determines whether both of the main and safing determination procedures $S_{main}$ and $S_{safe}$ indicate that the colliding object is a pedestrian. When the result of the logical AND operation is not "1", corresponding to "NO" at $S_{DET}$, the processing returns to "START". When the result of the logical AND operation is "1", corresponding to "YES" at $S_{DET}$, the processing proceeds to S108. At S108, the controller 13 reads the vehicle speed V detected by the vehicle speed sensor 11 and determines whether the vehicle speed V is in a predetermined threshold range between $V_{min}$ and $V_{max}$. It should be noted that one reason for performing the process S108 is that the pedestrian protection apparatus 21 is activated in only the case of the vehicle speed V within a vehicle-shape-dependent range in which the pedestrian protection function works properly. When it is determined that the vehicle speed V is in the predetermined threshold range, corresponding to "YES" at S108, the processing proceeds to $S_{fire}$. At $S_{fire}$, the controller 13 activates the pedestrian protection apparatus 21 (see FIG. 4) by igniting a squib (not shown) by using electric power from a battery or backup power source (not shown). When the vehicle speed V is not in the predetermined threshold range, corresponding to "NO" at S108, the processing returns to "START".

Figure 6:
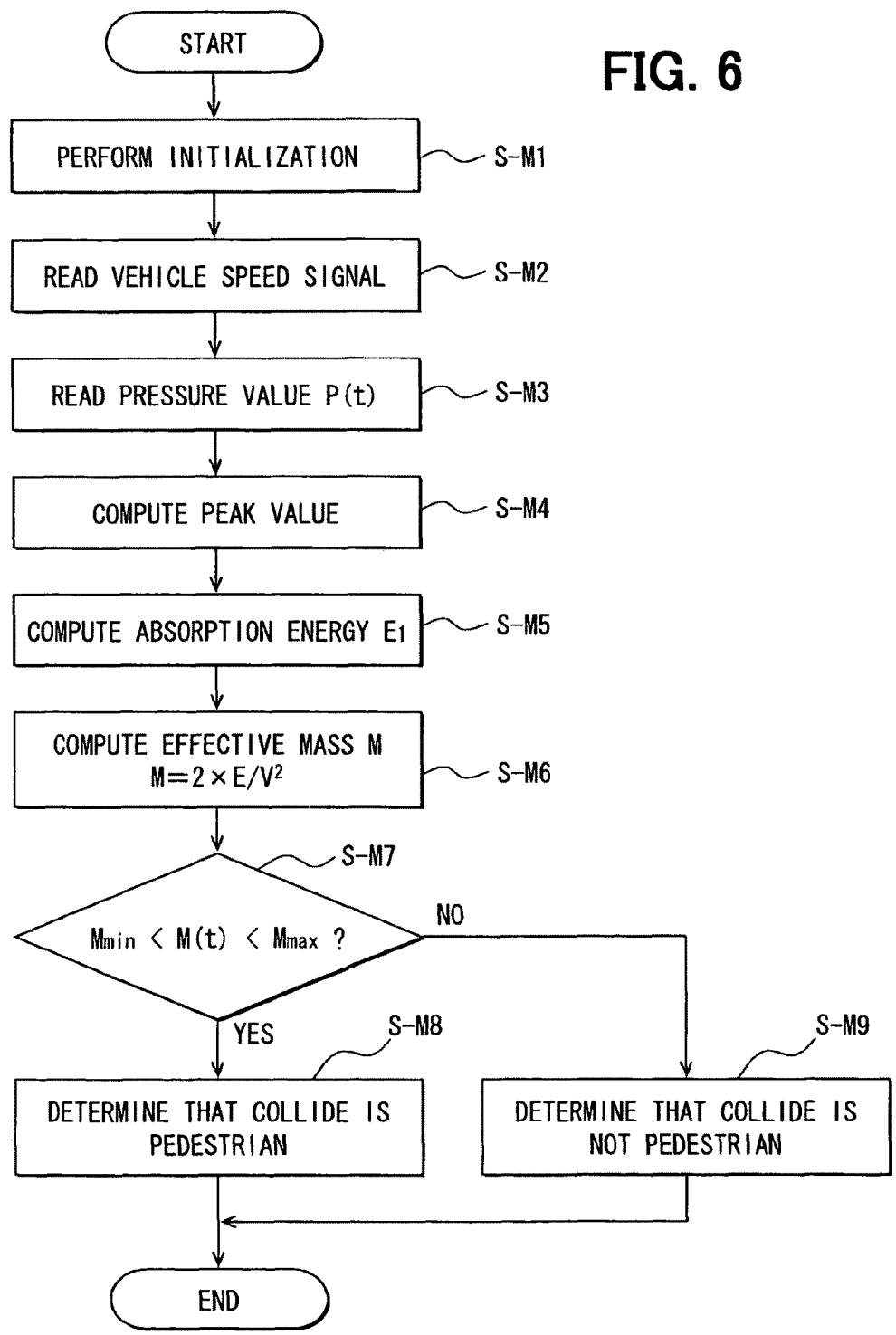
FIG. 6 is a flow chart illustrating a main determination procedure in accordance with one embodiment.

Referring to FIG. 6, there will be more specifically described the main determination procedure $S_{main}$. At S-M1, the controller 13 performs an initialization process including an initial value setting process to initialize variables associated with relevant sensors. At S-M2, the controller 13 reads a vehicle speed signal indicative of the vehicle speed V detected by the vehicle speed sensor 11. At S-M3, the controller 13 reads the time-dependent pressure value P(t) detected by the main sensor 9A. At S-M4, the controller 13 computes the peak value of the pressure value P(t) during the pressure change. At S-M5, the controller 13 computes the bumper absorption energy $E_1$ that corresponds to the peak value of the pressure value P(t). At S-M6, the controller 13 computes the effective mass M of the colliding body based on the computed absorption energy $E_1$ by using the equation $M=2E_1N^2$. At S-M7, the controller 13 determines whether the effective mass M is in a predetermined threshold range. When the effective mass M is in the predetermined threshold range, corresponding to "YES" at S-M7, the controller 13 determine at S-M8 that the colliding object is a pedestrian. When the effective mass M is not in the predetermined threshold range, corresponding to "NO" at S-M7, the controller 13 determines at S-M9 that the colliding object is not a pedestrian but another object. In one embodiment, the predetermined threshold range for the effective mass M is set between 2 kg and 10 kg.

Figure 7:
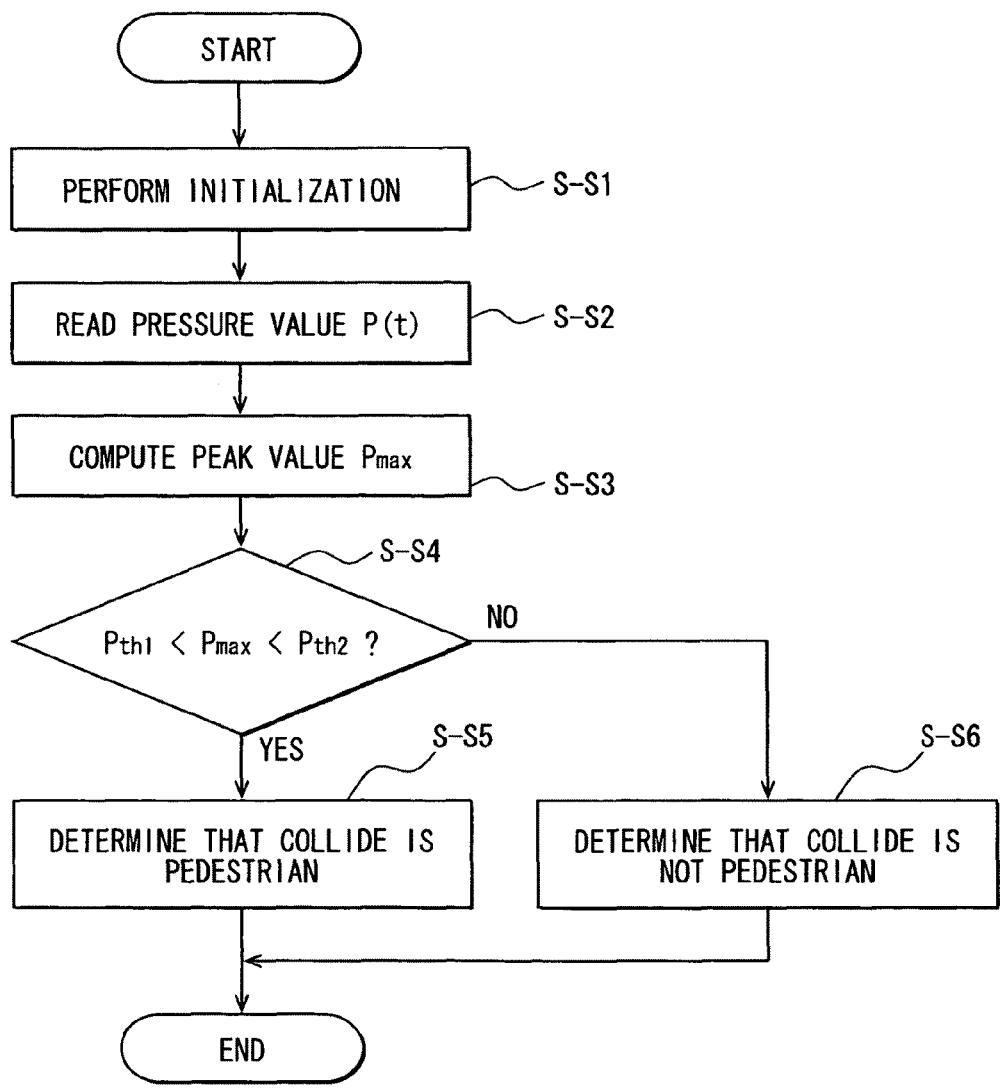
FIG. 7 is a flow chart illustrating a safing determination procedure in accordance with one embodiment.

Referring to FIG. 7, there will be more specifically described the safing determination procedure $S_{safe}$. At S-S1, the controller 13 performs an initialization process including an initial value setting process in which variables associated with relevant sensors are initialized. At S-S2, the controller 13 reads the time-dependent pressure value P(t) detected by the safing sensor 9B. At S-S3, the controller 13 computes the peak value $P_{max}$ of the pressure value P(t). At S-S4, the controller 13 determines whether the maximum value $P_{max}$ is in a predetermined threshold range. When the maximum value $P_{max}$ is in the predetermined threshold range, corresponding to "YES" at S-S4, the controller 13 determines at S-S5 that the colliding object is a pedestrian. When the maximum value $P_{max}$ is not in the predetermined threshold range, corresponding to "NO" at S-S4, the controller 13 determines at S-S6 that the colliding object is not a pedestrian but another object.

Figure 8:
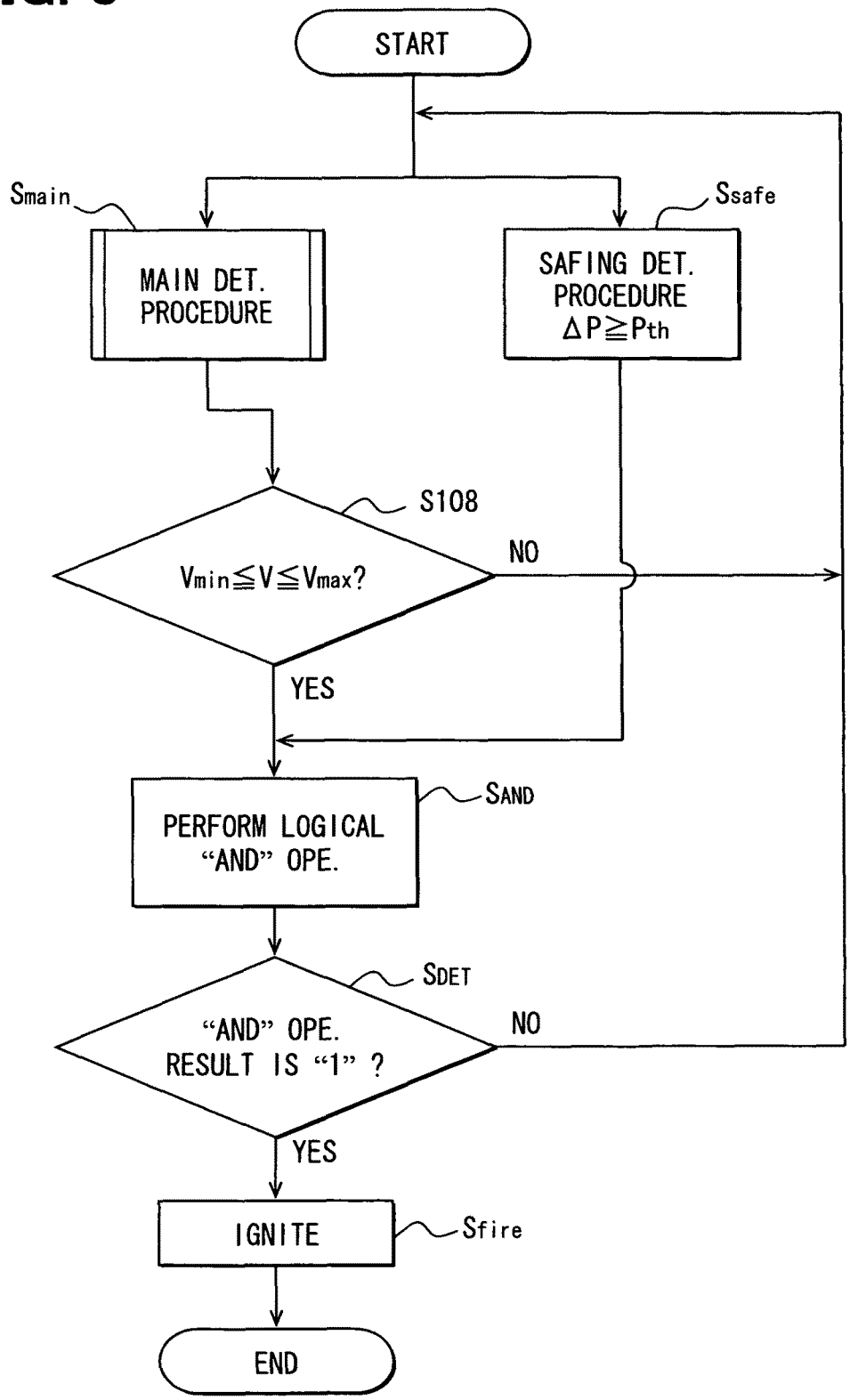
FIG. 8 is a flow chart illustrating a second exemplary processing to be performed by a controller of a collision determination apparatus in accordance with one embodiment.

Referring to FIG. 8, there will be described an alternative processing flow for the controller 13 of the collision determination apparatus. The alternative processing flow may be used when the collision determination apparatus is configured such that the first determination part 13A is provide by the CPU and the second determination part 13B is provided by the relatively simple IC with a comparator. FIG. 8 is a flow chart illustrating the alternative processing flow. As shown in FIG. 8, the controller 13 performs a main determination procedure $S_{main}$ by using the first determination part 13A and a safing determination procedure $S_{safe}$ by using the second determination part 13B, so that the main and safing procedures $S_{main}$ and $S_{safe}$ are performed independently of each other. The main determination procedure $S_{main}$ utilizes the above-described second determination manner to identify a type of the colliding object, such that: the effective mass of the colliding object is determined by substituting the pressure value detected by the main sensor 9A and the vehicle speed at the collision detected by the vehicle speed sensor 11 into a predetermined equation; and the effective mass is compared to a predetermined threshold. Thus, the main determination procedure $S_{main}$ in FIG. 8 is generally identical to that in FIG. 5. The safing determination procedure $S_{safe}$ in FIG. 8 is, on the other hand, different from and less complicated than that in FIG. 5. More specifically, at $S_{safe}$ in FIG. 8, the second determination part 13B does not compute the peak value (maximum value) of the pressure value during the pressure change but compares the pressure value from the safing sensor 9B to a threshold for collision determination, and outputs the control signal when the pressure value reaches the threshold. Accordingly, it is possible to provide the second determination part 13B (safing determination part 13B) by using the relatively simple IC with a comparator, and it is possible to provide the collision determination apparatus at a low cost.

As shown in FIG. 8, at $S_{main}$, the controller 13 determines whether the colliding object is a pedestrian. At $S_{safe}$, the controller 13 determines, by using the comparator, whether the colliding object is a pedestrian. At S108, the controller 13 reads the vehicle speed V detected by the vehicle speed sensor 11 and determines whether the vehicle speed V is in a predetermined threshold range between $V_{min}$ and $V_{max}$. When the vehicle speed V is in the predetermined threshold range, corresponding to "YES" at S108, the processing proceeds to $S_{AND}$. At $S_{AND}$, the controller 13 performs a logical AND operation between a determination result of the main determination procedure $S_{main}$ and that of the safing determination procedure $S_{safe}$. At $S_{DET}$, the controller 13 determines whether or not a result of the logical AND operation is "1", in other words, determines whether both of the main and safing determination procedures $S_{main}$ and $S_{safe}$ indicate that the colliding object is a pedestrian. When the result of the logical AND operation is not "1", corresponding to "NO" at $S_{DET}$, the processing returns to "START". When the result of the logical AND operation is "1", corresponding to "YES" at $S_{DET}$, the processing proceeds to $S_{fire}$. At $S_{fire}$, the controller 13 activates the pedestrian protection apparatus 21 (see also FIG. 4) by igniting the squib by using electric power from a battery or a backup power source (not shown). It should be noted that, when it is determined that the vehicle speed V is not in the predetermined threshold range, corresponding to "NO" at S108, the processing returns to "START".

As seen from the above explanation, since the main determination procedure $S_{main}$ and the safing determination procedure $S_{safe}$ are performed independently of each other, and since the collision determination is made based on a result of the logical AND operation between the determination results of the main and safing determination procedures $S_{main}$ and $S_{safe}$, it is possible to ensure sensing element redundancy, and further, it is possible to ensure determination circuit redundancy. Accordingly, even if a circuit of the first determination part 13A has a failure or suffers extrinsic perturbation such as electric noise and the like, the presence of the second determination part 13B ensures redundancy.

The above-described embodiments can be modified in various ways, examples of which are described below.

In the above-described embodiments, the collision determination apparatus for a vehicle is used to determine whether the collision necessitates activation of pedestrian protection apparatus mounted to the vehicle, such as an active food apparatus and an airbag on a cowl. Alternatively, the collision determination apparatus may be used to determine whether the collision necessitates a passenger protection apparatus such as an airbag for a driver seat, that for front passenger seat, that for a rear passenger seat and the like as long as the collision takes place at the vehicle bumper.

In the above-described embodiments, the chamber member 7 has the first attachment hole and the second attachment hole, through which the main sensor 9A and the safing sensor 9B are respectively inserted in the chamber space 7a. Alternatively, the chamber member 7 may have one attachment hole, though which both of the main sensor 9A and the safing sensor 9B are inserted in the chamber space 7a. According to the above alternative configuration, it is possible to use a single package having multiple sensing elements acting as the main sensor 9A and the safing sensor 9B, and it is possible to insert the multiple sensing elements into the chamber space 7a through the one attachment hole. In such a configuration, it becomes possible to provide the collision determination apparatus at a more low cost while ensuring collision detection sensor redundancy.

In the above-described embodiments, the main sensor 9A and the safing sensor 9B are respectively arranged at end parts of the chamber member 7 opposite to each other in the vehicle width direction. In other words, the end parts of the chamber member 7 respectively have the first attachment hole and the second attachment hole, through which the main sensor 9A and the safing sensor 9B are respectively inserted in the chamber space 7a. However, locations of the attachment holes on the chamber member 7 are not limited to the above examples and can be modified.

In the above embodiments, the main sensor 9A and the safing sensor 9B are attached to the same chamber member 7. In other words, the main sensor 9A and the safing sensor 9B individually sense the pressure change in the same chamber member 7. Alternatively, the main sensor 9A and the safing sensor 9B may be attached to different chamber members. For example, the main sensor 9A and the safing sensor 9B may be attached to upper and lower chamber members provided differently from each other.

While the invention has been described above with reference to various embodiments thereof, it is to be understood that the invention is not limited to the above described embodiments and constructions. The invention is intended to cover various modifications and equivalent arrangements. In addition, while the various combinations and configurations described above are contemplated as embodying the invention, other combinations and configurations, including more, less or only a single element, are also contemplated as being within the scope of embodiments.

What is claimed is:

1. A collision determination apparatus for a vehicle having a bumper, the collision determination apparatus being coupled with a protection apparatus mounted to the vehicle, the collision determination apparatus comprising:
    a chamber member that is arranged in the bumper and has therein a chamber space;
    a main sensor and a safing sensor that are two pressure sensors and individually sense a pressure change of the same chamber space of the chamber member, wherein the main sensor and the safing sensor provide a first pressure sensing result and a second pressure sensing result, respectively;
    a vehicle speed sensor that senses a speed of the vehicle, thereby providing a speed sensing result; and
    a collision determination unit that is configured to detect an occurrence of a collision between an object and the bumper, and configured to determine whether or not the collision necessitates activation of the protection apparatus based on the first pressure sensing result, the second pressure sensing result and the speed sensing result, wherein the collision determination unit includes:
        a first determination part configured to make a first determination of whether or not the collision necessitates the activation of the protection apparatus by determining whether or not an effective mass of the colliding object is in a predetermined mass range and the speed of the vehicle at the collision is in a predetermined speed range, wherein by making the first determination, the first determination part provides a first determination result, wherein the first determination part calculates the effective mass of the colliding object from the first pressure sensing result and the speed sensing result, wherein the first determination part obtains the effective mass of the colliding object by using the pressure sensed by the main sensor and the vehicle speed sensed by the vehicle speed sensor, wherein the first determination is based on the first pressure sensing result and the speed sensing result;
        a second determination part configured to make, independently of the first determination part, a second determination of whether or not the collision necessitates the activation of the protection apparatus by comparing only the second pressure sensing result with a predetermined threshold, wherein by making the second determination, the second determination part provides a second determination result, wherein the second determination is based on only the second pressure sensing result, wherein the second determination part identifies a type of the colliding object based on the peak value of the changing pressure sensed by the safing sensor; and
        an AND circuit configured to perform a logical AND operation between
            (i) the first determination result, which is a result of the first determination made by the first determination part based not on the pressure change sensed with the safing sensor but on the pressure change sensed with the main sensor, and
            (ii) the second determination result, which is a result of the second determination made by the second determination part based not on the pressure change sensed with the main sensor but on the pressure change sensed with the safing sensor, and
        activate the protection apparatus when a result of the logical AND operation is true.

2. The collision determination apparatus according to claim 1, wherein:
    the protection apparatus is a pedestrian protection apparatus that protects a pedestrian colliding with the bumper.

3. The collision determination apparatus according to claim 1, wherein:
    the chamber member has thereon a sensor attachment hole, through which the main sensor and the safing sensor are inserted in the chamber space.

4. The collision determination apparatus according to claim 1, wherein:
    the chamber member has thereon a first sensor attachment hole and a second sensor attachment hole;
    the main sensor is inserted in the chamber space through the first sensor attachment hole; and
    the safing sensor is inserted in the chamber space through the second sensor attachment hole.

5. The collision determination apparatus according to claim 4, wherein:
    the chamber member is arranged in the bumper so as to extend in a width direction of the vehicle and so as to have a first end part and a second end part opposite to each other in the width direction;
    the first end part of the chamber member has the first attachment hole; and
    the second end part of the chamber member has the second attachment hole.

6. The collision determination apparatus according to claim 1, wherein:
    the second determination part includes an IC having a comparator.

7. The collision determination apparatus according to claim 1, wherein:
    the protection apparatus is a pedestrian protection apparatus; and the AND circuit is configured to activate the pedestrian protection apparatus when both of the first and second determination results indicate that the object colliding with the bumper is the pedestrian.

8. The collision determination apparatus according to claim 1, wherein:
the first determination part determines whether or not the colliding object is a pedestrian based on the effective mass of the colliding object; and
the second determination part determines whether or not the colliding object is a pedestrian based on the peak value of the changing pressure sensed by the safing sensor.

9. The collision determination apparatus according to claim 1, wherein
the AND circuit provides the result of the logical AND operation as the true and activates the protection apparatus when both of (i) the first determination result, which is based not on the pressure change sensed with the safing sensor but on the pressure change sensed with the main sensor, and (ii) the second determination result, which is based not on the pressure change sensed with the main sensor but on the pressure change sensed with the safing sensor, are that the collision necessitates the activation of the protection apparatus; and
the AND circuit provides the result of the logical AND operation as false and does not activate the protection apparatus when at least one of (i) the first determination result, which is based not on the pressure change sensed with the safing sensor but on the pressure change sensed with the main sensor, or (ii) the second determination result, which is based not on the pressure change sensed with the main sensor but on the pressure change sensed with the safing sensor, is that the collision does not necessitate the activation of the protection apparatus.

\* \* \* \* \*